United States Patent
Shin (10) Patent No.: US 11,618,457 B2
(45) Date of Patent: Apr. 4, 2023

(54) VEHICLE AND METHOD OF CONTROLLING THE SAME

(71) Applicants: Hyundai Motor Company, Seoul (KR); Kia Motors Corporation, Seoul (KR)

(72) Inventor: Hyunwoo Shin, Suwon-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 223 days.

(21) Appl. No.: 17/118,287

(22) Filed: Dec. 10, 2020

(65) Prior Publication Data

US 2022/0017099 A1   Jan. 20, 2022

(30) Foreign Application Priority Data

Jul. 14, 2020   (KR) ....................... 10-2020-0086681

(51) Int. Cl.
| | |
|---|---|
| *B60W 10/18* | (2012.01) |
| *B60W 10/119* | (2012.01) |
| *B60W 40/09* | (2012.01) |
| *B60W 30/18* | (2012.01) |
| *B60W 30/02* | (2012.01) |
| *B60W 30/09* | (2012.01) |

(Continued)

(52) U.S. Cl.
CPC .......... *B60W 40/09* (2013.01); *B60W 10/119* (2013.01); *B60W 10/18* (2013.01); *B60W 30/02* (2013.01); *B60W 30/09* (2013.01); *B60W 30/0953* (2013.01); *B60W 30/0956* (2013.01); *B60W 30/188* (2013.01); *B60W 30/18163* (2013.01); *B60W 2520/10* (2013.01); *B60W 2540/30* (2013.01); *B60W 2554/4042* (2020.02); *B60W 2554/802* (2020.02); *B60W 2554/804* (2020.02); *B60W 2555/60* (2020.02)

(58) Field of Classification Search
CPC .... B60W 10/18; B60W 10/119; B60W 30/02; B60W 30/09; B60W 30/0953; B60W 30/0956; B60W 30/18163; B60W 30/188; B60W 40/09; B60W 2554/804; B60W 2554/4042; B60W 2554/802; B60W 2555/60; B60W 2520/10; B60W 2540/30
See application file for complete search history.

(56) References Cited

U.S. PATENT DOCUMENTS

| | | | | |
|---|---|---|---|---|
| 2002/0180266 | A1* | 12/2002 | Hara | B60W 30/18109 903/918 |
| 2004/0199320 | A1* | 10/2004 | Harada | B60W 30/18145 701/69 |

(Continued)

FOREIGN PATENT DOCUMENTS

KR   10-1251502 B1   4/2013

*Primary Examiner* — Edwin A Young
(74) *Attorney, Agent, or Firm* — Morgan, Lewis & Bockius LLP (57) ABSTRACT

A method of controlling the vehicle may include predicting, by a controller, a braking situation of the vehicle; performing, by the controller, brake distribution control of front and rear wheels of the vehicle in a response to a predicted sudden braking of the vehicle at a predetermined level; and performing, by the controller, independent braking control of the rear wheels of the vehicle in a response to a predicted general braking of the vehicle at the predetermined level.

20 Claims, 9 Drawing Sheets

(51) Int. Cl.
*B60W 30/095* (2012.01)
*B60W 30/188* (2012.01)

(56) References Cited

U.S. PATENT DOCUMENTS

| | | | |
|---|---|---|---|
| 2007/0222289 A1* | 9/2007 | Fukuda | B60T 8/1769 303/192 |
| 2011/0320099 A1* | 12/2011 | Kim | B60T 8/885 701/70 |
| 2016/0059836 A1* | 3/2016 | Kim | B60T 8/4081 303/10 |
| 2016/0207533 A1* | 7/2016 | Uechi | B60W 50/045 |
| 2018/0118024 A1* | 5/2018 | Watanabe | B60K 23/04 |

* cited by examiner

| [kph] | ΔS ≤ 10 | 10 < ΔS ≤ 20 | 20 < ΔS ≤ 30 | 30 < ΔS ≤ 40 | 40 < ΔS |
|---|---|---|---|---|---|
| FIRST SPEED FACTOR | N11 | N12 | N13 | N14 | N15 |

FIG. 5B

| | R ≤ 0.2 | 0.2 < R ≤ 0.4 | 0.4 < R ≤ 0.6 | 0.6 < R ≤ 0.8 | 0.8 < R |
|---|---|---|---|---|---|
| SECOND SPEED FACTOR | N21 | N22 | N23 | N24 | N25 |

| | $OV \leq X1$ | $X1 < OV \leq X2$ | $X2 < OV \leq X3$ | $X3 < OV \leq X4$ | $X4 < OV$ |
|---|---|---|---|---|---|
| OVERTAKING FACTOR | N31 | N32 | N33 | N34 | N35 |

FIG. 8

| | $S+OV \leq X11$ | $X11 < S+OV \leq X12$ | $X12 < S+OV \leq X13$ | $X13 < S+OV \leq X14$ | $X14 < S+OV$ |
|---|---|---|---|---|---|
| PROPENSITY CLASSIFICATION | SAFETY ORIENTATION | STABLE | NORMAL | AGGRESSIVE | ATROCITIES |

VEHICLE AND METHOD OF CONTROLLING THE SAME

CROSS-REFERENCE TO RELATED APPLICATION(S)

The present application claims priority to Korean Patent Application No. 10-2020-0086681, filed on Jul. 14, 2020, the entire contents of which is incorporated herein for all purposes by this reference.

BACKGROUND OF THE INVENTION

Field of the Invention

The present invention relates to a vehicle, and to a vehicle having a four-wheel drive system.

Description of Related Art

A drive system of a vehicle may be classified into a front-wheel drive type, a rear-wheel drive type, and a four-wheel drive type. In the front-wheel drive type, power is transmitted to front wheels to drive the front wheels. In the rear-wheel drive type, power is transmitted to rear wheels to drive the rear wheels. In the four-wheel drive type, power of an appropriate size is distributed to each of the front and rear wheels. In the four-wheel drive type, only the rear wheels may be driven alone. In the four-wheel drive type, a main drive wheel and an auxiliary drive wheel are classified, mainly the rear wheels is classified into the main drive wheel and the front wheel is classified into the auxiliary drive wheel.

In a four-wheel drive vehicle, there are a model provided with a disconnector for physically connecting/disconnecting transmission of power to the auxiliary drive wheel, and a model without the disconnector. In model without the disconnector, the power transmission is electronically connected/disconnected via a control signal.

In the four-wheel drive vehicle, for braking control (or regenerative braking control), distribution control of front and rear wheels or independent control of rear wheels is selectively performed. However, in a process of connecting/disconnecting the transmission of power to the front wheels (auxiliary drive wheels), a drive delay of the disconnector or a delay in transmission of communication signals occurs, and to maintain a total amount of braking during the present delay time, hydraulic braking is responsible for a portion of the total amount of braking. An intervention of the hydraulic braking during the delay time is accompanied by a loss of regenerative braking. As a result, the loss of regenerative braking due to the intervention of hydraulic braking causes the vehicle's fuel economy to drop.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a vehicle configured for predicting sudden braking and overtaking of a subject vehicle based on a driving tendency of a driver of the subject vehicle and a state of another vehicle in the front of the vehicle, and improving fuel economy of the vehicle by blocking or minimizing intervention of hydraulic braking by performing four-wheel drive control and regenerative braking control based on the predicted result.

Additional aspects of the present invention will be set forth in part in the description which follows, and in part, will be obvious from the description, or may be learned by practice of the present invention.

In accordance with an aspect of the present invention, a method of controlling a vehicle may include predicting, by a controller, a braking situation of the vehicle; performing, by the controller, brake distribution control of front and rear wheels of the vehicle in a response to a predicted sudden braking of the vehicle at a predetermined level; and performing, by the controller, independent braking control of the rear wheels of the vehicle in a response to a predicted general braking of the vehicle at the predetermined level.

The method may further include determining, by the controller, a driving propensity of a driver of the vehicle; measuring, by the controller, a driving state of another vehicle driving in front of the vehicle; and predicting, by the controller, the braking situation of the vehicle based on the driving propensity of the driver and the driving state of another vehicle.

The determining of the driving propensity of the driver may include determining a speed factor and an overtaking factor in a driving type of the driver; and determining a driving propensity index of the driver based on the speed factor and the overtaking factor.

The method may further include determining, by the controller, a first speed factor based on the occurrence of a case where an actual speed of the vehicle is faster than a prescribed speed of a road on which the vehicle is driven; determining, by the controller, a second speed factor based on a frequency of occurrence of a case where a speed of the vehicle is faster than a speed of another vehicle located in front of the vehicle; and determining, by the controller, a sum of the first speed factor and the second speed factor as the speed factor.

The method may further include determining, by the controller, the overtaking factor based on an overtaking maneuver of the vehicle in a response to a speed of the vehicle is faster than a speed of another vehicle located in front of the vehicle.

The driving state of another vehicle may include a speed of another vehicle, a relative speed of another vehicle with respect to the vehicle, and a distance between the vehicle and another vehicle.

The driving propensity of the driver may be classified into a driving propensity that prioritizes safety and a driving propensity that does not prioritize safety, depending on a degree of consideration for safe driving.

The predicting of the braking situation of the vehicle may include expecting that sudden braking of the vehicle occurs in a response to the vehicle's speed being faster than a speed of another vehicle in the front of the vehicle, and the driving propensity being the second driving propensity in which the safety of the driving is not prioritized.

The method may further include, in a response to the sudden braking of the vehicle being expected, converting the vehicle to a four-wheel drive mode in a response to a distance between the vehicle and another vehicle reaching a preset distance between the vehicle and another vehicle; and releasing the four-wheel drive mode in a response to a lapse of a preset time after converting to the four-wheel drive mode.

In accordance with another aspect of the present invention, a vehicle may include a four-wheel drive system; and a controller configured to predict a braking situation of the vehicle, to perform brake distribution control of front and rear wheels of the vehicle in a response to a predicted sudden braking of the vehicle at a predetermined level, and to perform independent braking control of the rear wheels of the vehicle in a response to a predicted general braking of the vehicle at the predetermined level.

The controller may be configured to determine a driving propensity of a driver, to measure by the controller, a driving state of another vehicle driving in front of the vehicle, and to predict the braking situation of the vehicle based on the driving propensity of the driver and the driving state of another vehicle.

The determining of the driving propensity of the driver may include determining a speed factor and an overtaking factor in a driving type of the driver; and determining a driving propensity index of the driver based on the speed factor and the overtaking factor.

The controller may be configured to determine a first speed factor based on the occurrence of a case where an actual speed of the vehicle is faster than a prescribed speed of a road being driven, to determine a second speed factor based on a frequency of occurrence of a case where a speed of the vehicle is faster than a speed of another vehicle located in front of the vehicle, and to determine a sum of the first speed factor and the second speed factor as the speed factor.

The controller may be configured to determine the overtaking factor based on an overtaking maneuver of the vehicle in a response to a speed of the vehicle is faster than a speed of another vehicle located in front of the vehicle.

The driving state of another vehicle may include a speed of another vehicle, a relative speed of another vehicle with respect to the vehicle, and a distance between the vehicle and another vehicle.

The driving propensity of the driver may be classified into a driving propensity that prioritizes safety and a driving propensity that does not prioritize safety, depending on a degree of consideration for safe driving.

The predicting of the braking situation of the vehicle may include expecting that sudden braking of the vehicle occurs in a response to the vehicle's speed being faster than a speed of another vehicle in the front of the vehicle, and the driving propensity being the second driving propensity in which the safety of the driving is not prioritized.

The controller may be configured to, upon determining that the sudden braking of the vehicle is expected, convert the vehicle to a four-wheel drive mode in a response to a distance between the vehicle and another vehicle reaching a preset distance between the vehicle and another vehicle, and to release the four-wheel drive mode in a response to a lapse of a preset time after converting to the four-wheel drive mode.

In accordance with another aspect of the present invention, a method of controlling a vehicle may include determining, by a controller, a driving propensity of a driver of the vehicle; measuring, by the controller, a driving state of another vehicle driving in front of the vehicle; predicting, by the controller, a braking situation of the vehicle based on the driving propensity of the driver and the driving state of another vehicle; performing, by the controller, brake distribution control of front and rear wheels of the vehicle in a response to a predicted sudden braking of the vehicle at a predetermined level; and performing, by the controller, independent braking control of the rear wheels of the vehicle in a response to a predicted general braking of the vehicle at the predetermined level.

The driving propensity of the driver may be classified into a driving propensity that prioritizes safety and a driving propensity that does not prioritize safety, depending on a degree of consideration for safe driving. The predicting of the braking situation of the vehicle may include expecting that sudden braking of the vehicle occurs in a response to the vehicle's speed being faster than a speed of another vehicle in the front of the vehicle, and the driving propensity being the second driving propensity in which the safety of the driving is not prioritized.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 1:
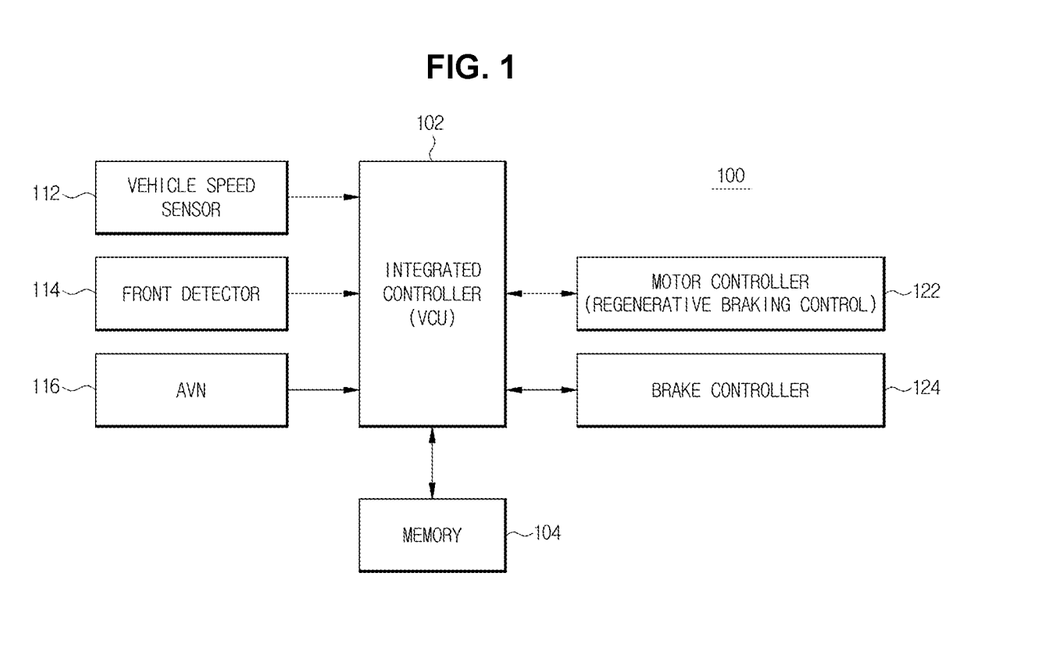
FIG. 1 is a view exemplarily illustrating a control system of a vehicle according to various exemplary embodiments of the present invention.

FIG. 1 is a view exemplarily illustrating a control system of a vehicle according to various exemplary embodiments of the present invention.

As illustrated in FIG. 1, an integrated controller (VCU) 102, which is involved in overall control of a vehicle 100, may be connected to a memory 104, a vehicle speed sensor 112, a front detector 114, an audio-video navigation (AVN) 116, a motor controller 122, and a brake controller 124 to enable communication.

The memory 104 may store data such as a driving propensity index of a driver.

The vehicle speed sensor 112 may measure a speed of the vehicle 100 and provide vehicle speed information to the integrated controller 102.

The front detector 114 may detect a situation in front of the vehicle 100. The front detector 114 may detect the presence of other vehicles, pedestrians, or obstacles in front of the vehicle 100 and provide the detection result to the integrated controller 102. The front detector 114 may be, for example, a Light Detection And Ranging (LiDAR), a radar, or a camera.

The AVN 116 performs an Audio/Video/Navigation function. The AVN 116 may provide information related to a prescribed speed of a road on which the vehicle 100 is currently driving to the integrated controller 102 through the navigation function.

The motor controller 122 may be involved in regenerative braking control of each of the front and rear wheels during braking of the vehicle 100.

The brake controller 124 may control a brake system of the vehicle 100 in a response to the driver's manipulation of a brake pedal so that the vehicle 100 is decelerated.

Figure 2:
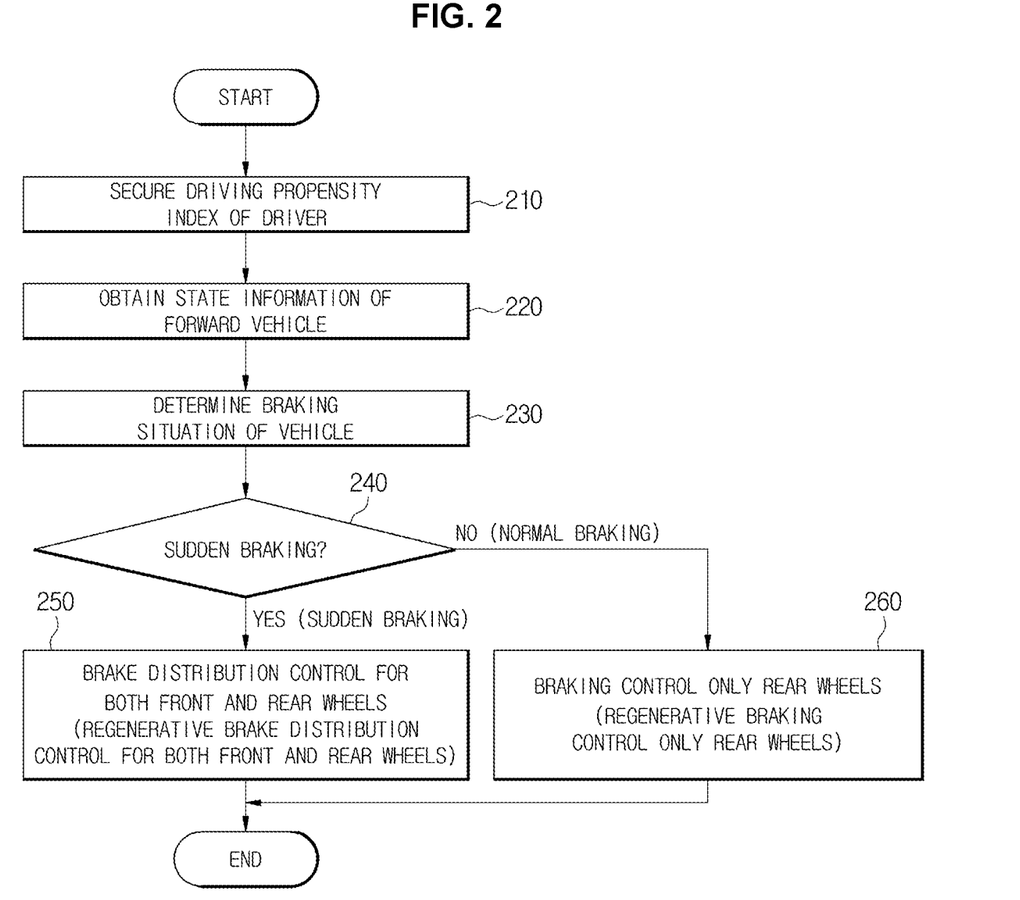
FIG. 2 is a view exemplarily illustrating a method of controlling a vehicle according to various exemplary embodiments of the present invention.

FIG. 2 is a view exemplarily illustrating a method of controlling a vehicle according to various exemplary embodiments of the present invention. The vehicle control method illustrated in FIG. 2 may be performed by controlling the integrated controller 102 based on a configuration of the control system illustrated in FIG. 1 above. In the vehicle control method illustrated in FIG. 2, the integrated controller 102 may predict the sudden braking and overtaking of the subject vehicle 100 based on the driving propensity of the driver of the subject vehicle 100 and a state of another vehicle in the front of the vehicle, and improve fuel economy of the vehicle 100 by performing four-wheel drive control and regenerative braking control based on the prediction result.

As illustrated in FIG. 2, the integrated controller 102 may secure the driving propensity index of the driver (210). The integrated controller 102 may analyze a driving type of the driver in a usual manner and obtain the driving propensity index of the driver in advance. Alternatively, the integrated controller 102 may obtain the driving propensity index of the driver in real time by analyzing the driving type of the driver in real time. The driving propensity index of the driver secured by the integrated controller 102 may be stored in the memory 104.

The integrated controller 102 may obtain state information related to a forward vehicle (220). The state information related to the forward vehicle may include information related to the speed of the forward vehicle, a distance between vehicles, and a relative speed. The distance between vehicles may refer to a relative distance between the subject vehicle 100 and the forward vehicle. The relative speed may refer to a relative speed between the subject vehicle 100 and the forward vehicle.

The integrated controller 102 may determine the braking situation of the vehicle 100 based on the driver's driving propensity index and the state information related to the forward vehicle (230).

The integrated controller 102 may distinguish whether the braking situation of the vehicle 100 is a sudden braking situation or a general braking situation (240). When the vehicle 100 exceeds a deceleration of braking (e.g., Ng value) which may be handled by the rear wheels alone, that is, the deceleration of braking to be responded to through both the front and rear wheels, the integrated controller 102 may determine that it is the sudden braking situation that satisfies a preset sudden braking condition. On the other hand, when the vehicle 100 is less than or equal to the deceleration of braking (for example, Ng value) which may be handled by the rear wheels alone, the integrated controller 102 may determine that it is the general braking situation that does not satisfy the sudden braking condition. In other words, the sudden braking situation may refer to a situation in which braking is required through both the front and rear wheels, and the general braking situation may refer to a situation in which the rear wheels may be braked alone. Here, the front wheel may be classified as an auxiliary drive wheel, and the rear wheels may be classified as a main drive wheel.

When the braking situation of the vehicle 100 satisfies the sudden braking condition (YES in 240), the integrated controller 102 may perform brake distribution control for both the front and rear wheels of the vehicle 100, and perform regenerative brake distribution control for both the front and rear wheels (250).

On the other hand, when the braking situation of the vehicle 100 does not satisfy the sudden braking condition (NO in 240), the integrated controller 102 may perform braking control only the rear wheels, and perform regenerative braking control only the rear wheels (260).

When the vehicle 100 is braking, the regenerative braking may be performed at the front or rear wheels. The vehicle 100 according to the exemplary embodiment of the present invention may selectively perform distributed braking of the front and rear wheels and independent braking of the rear wheels according to the braking situation. The vehicle 100 may improve fuel economy through the regenerative braking by selectively performing distributed regenerative braking of the front and rear wheels and independent regenerative braking of the rear wheels according to the braking situation.

Figure 3:
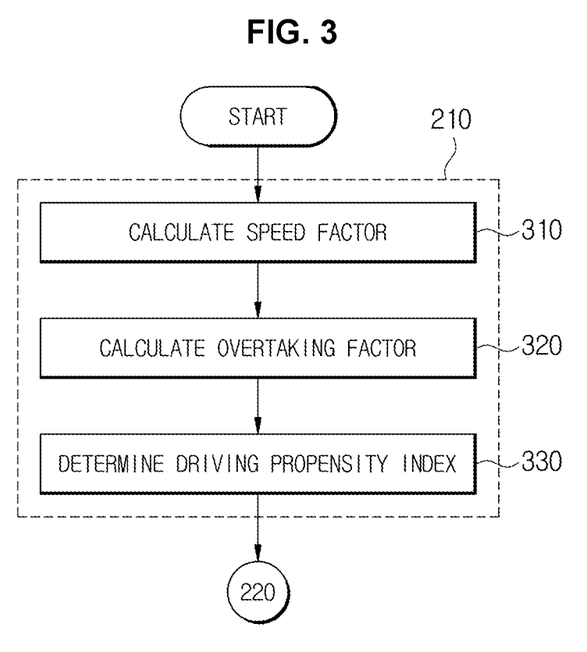
FIG. 3 is a view exemplarily illustrating a method of determining a driving propensity index of a driver in the method of controlling the vehicle illustrated in FIG. 2.

FIG. 3 is a view exemplarily illustrating a method of determining a driving propensity index of a driver in the method of controlling the vehicle illustrated in FIG. 2.

The integrated controller 102 first determines a speed factor to determine the driving propensity index of the driver (310). The determination of the speed factor will be described in detail with reference to FIG. 4 and FIG. 5 to be described later.

Furthermore, the integrated controller 102 may determine an overtaking factor to determine the driving propensity index of the driver (320). The operation of the overtaking factor will be described in detail with reference to FIG. 6 and FIG. 7 to be described later.

The integrated controller 102 determines the driving propensity index using the speed factor and the overtaking factor determined as described above (330). The determination of the driving propensity index will be described in detail with reference to FIG. 8 to be described later.

Figure 4:
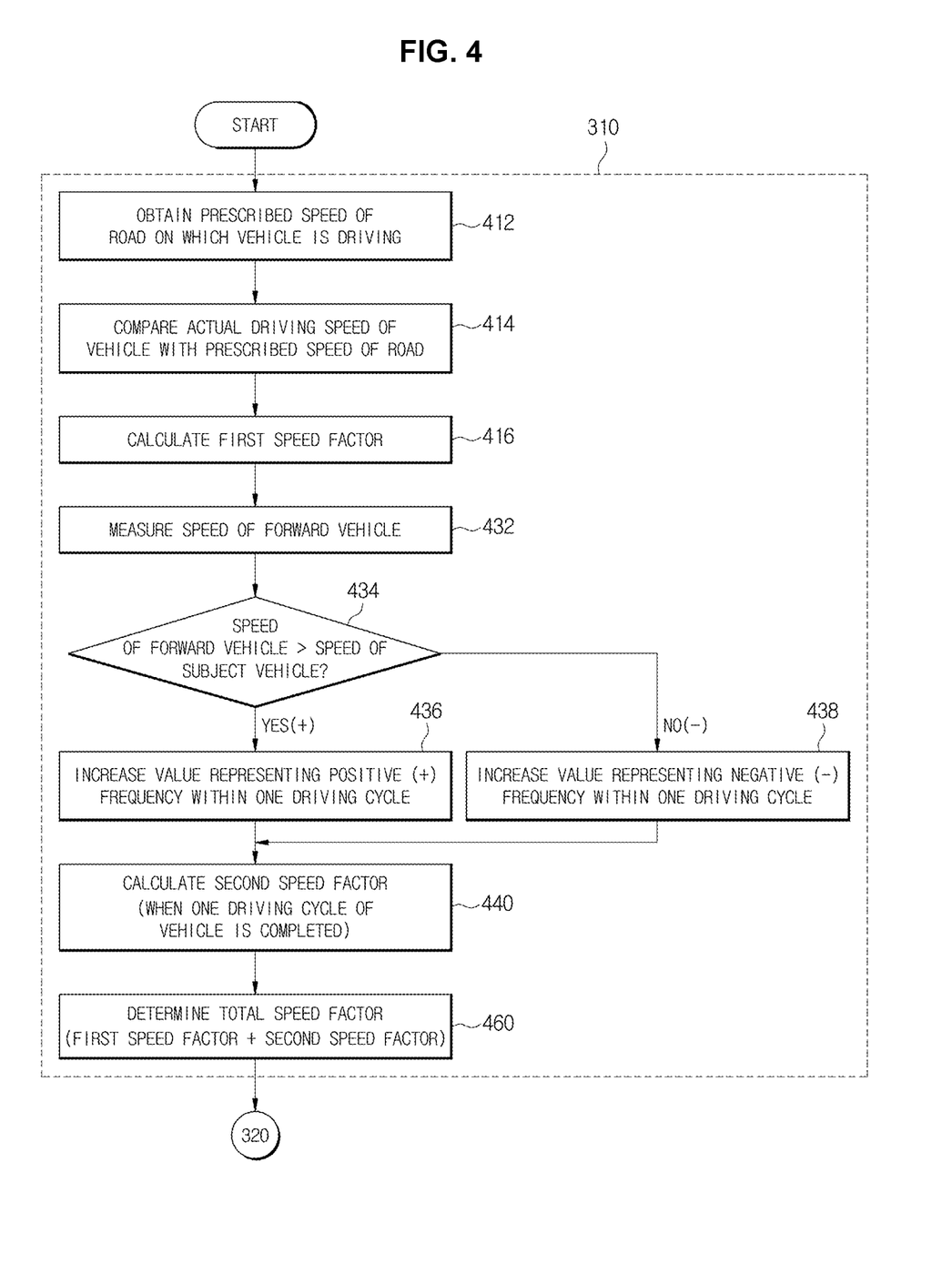
FIG. 4 is a view exemplarily illustrating a method of determining a vehicle speed factor according to various exemplary embodiments of the present invention.
Figure 5A:
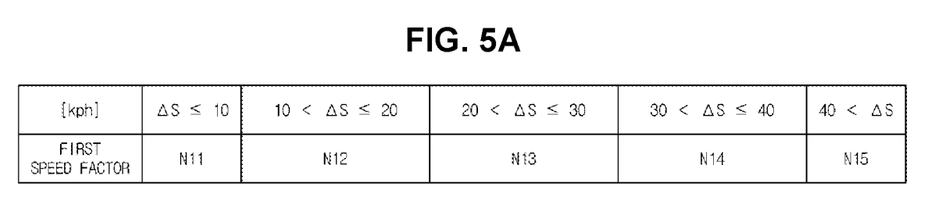
FIG. 5A and FIG. 5B are views exemplarily illustrating an operation of a vehicle speed factor according to various exemplary embodiments of the present invention.

FIG. 4 is a view exemplarily illustrating a method of determining a vehicle speed factor according to various exemplary embodiments of the present invention.

As illustrated in FIG. 4, to determine the speed factor, the integrated controller 102 may obtain information related to the prescribed speed of the road on which the vehicle 100 is driving (412). The prescribed speed of the road may be identified from prescribed speed information related to the road provided by the AVN 116 of the vehicle 100.

Furthermore, the integrated controller 102 may compare an actual driving speed of the vehicle 100 with the prescribed speed of the road (414).

Furthermore, the integrated controller 102 may determine a first speed factor from the comparison result of the actual driving speed of the vehicle 100 and the prescribed speed of the road (416). FIG. 5A is a view exemplarily illustrating an operation of the first speed factor of the vehicle 100 according to the exemplary embodiment of the present invention. As illustrated in FIG. 5A, when a difference between the actual driving speed and the prescribed speed is a speed difference ΔS, the speed difference ΔS may be classified into 10 kph intervals, and the first speed factor of different values such as N11, N12, and . . . may be provided at each classified interval. When the speed difference ΔS of the difference between the actual driving speed and the prescribed speed is less than or equal to 10 kph, a value of the first speed factor may become a predetermined value N11. Alternatively, when the speed difference ΔS of the difference between the actual traveling speed and the prescribed speed exceeds 40 kph, the value of the first speed factor may become another predetermined value N15. The first speed factor may be an indicator of how much the driver complies with the prescribed speed. That is, as the speed difference ΔS between the actual driving speed and the prescribed speed increases, the value of the first speed factor may also increase, and as the value of the first speed factor increases, it may be determined that the driver has a greater propensity to drive at a greater speed than the prescribed speed.

Referring to FIG. 4 again, the integrated controller 102 having completed the determination of the first speed factor may measure the speed of another vehicle located in front of the vehicle 100 (432). The speed of another vehicle located in front of the vehicle 100 may be measured through the front detector 114.

Subsequently, the integrated controller 102 may determine the difference between the speed of another vehicle in front and the speed of the subject vehicle 100 (434). The determination of the speed difference is made for each driving cycle. In the exemplary embodiment of the present invention, 'start on-drive-start off' may be defined as one driving cycle. The integrated controller 102 may determine the speed difference between another vehicle in front and the subject vehicle 100 by repeating at predetermined time intervals or at preset time points while the vehicle 100 is driving.

When the speed of another vehicle in front is greater than the speed of the subject vehicle 100, that is, when the result value is (+), the integrated controller 102 may increase a value representing a positive (+) frequency within one driving cycle by 1 (436).

Conversely, when the speed of another vehicle in front is less than or equal to the speed of the subject vehicle 100, that is, when the result value is 0 or (−), the integrated controller 102 may increase a value representing a negative (−) frequency within one driving cycle by 1 (438).

Figure 5B:
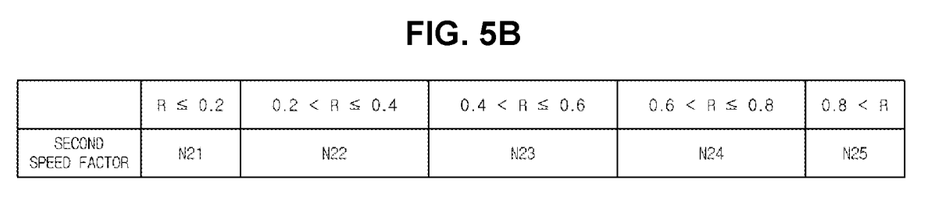

When one driving cycle of the vehicle 100 is completed, that is, when the driving of the vehicle 100 is completed, the integrated controller 102 may determine a second speed factor (440). FIG. 5B is a view exemplarily illustrating an operation of a second speed factor of the vehicle 100 according to the exemplary embodiment of the present invention. As illustrated in FIG. 5B, a weight R reflecting the count value of the positive (+) frequency and the count value of the negative (−) frequency obtained based on the difference between the speed of the forward vehicle and the speed of the subject vehicle 100 may be determined, and the second speed factor of different values may be determined according to the weight R. The weight R may be defined as R=((+) count value)/((+) count value+((−) count value)). When the weight R is less than or equal to 10, the value of the second speed factor may become a predetermined value N21. Alternatively, when the weight R exceeds 40, the value of the second speed factor may become another predetermined value N25. The second speed factor may be used as an indicator of how much the driver complies the distance between other vehicles in front.

Referring to FIG. 4 again, when the determination of the first speed factor and the second speed factor is completed, the integrated controller 102 may determine a total speed factor obtained by adding the value of the first speed factor and the value of the second speed factor (460).

Figure 6:
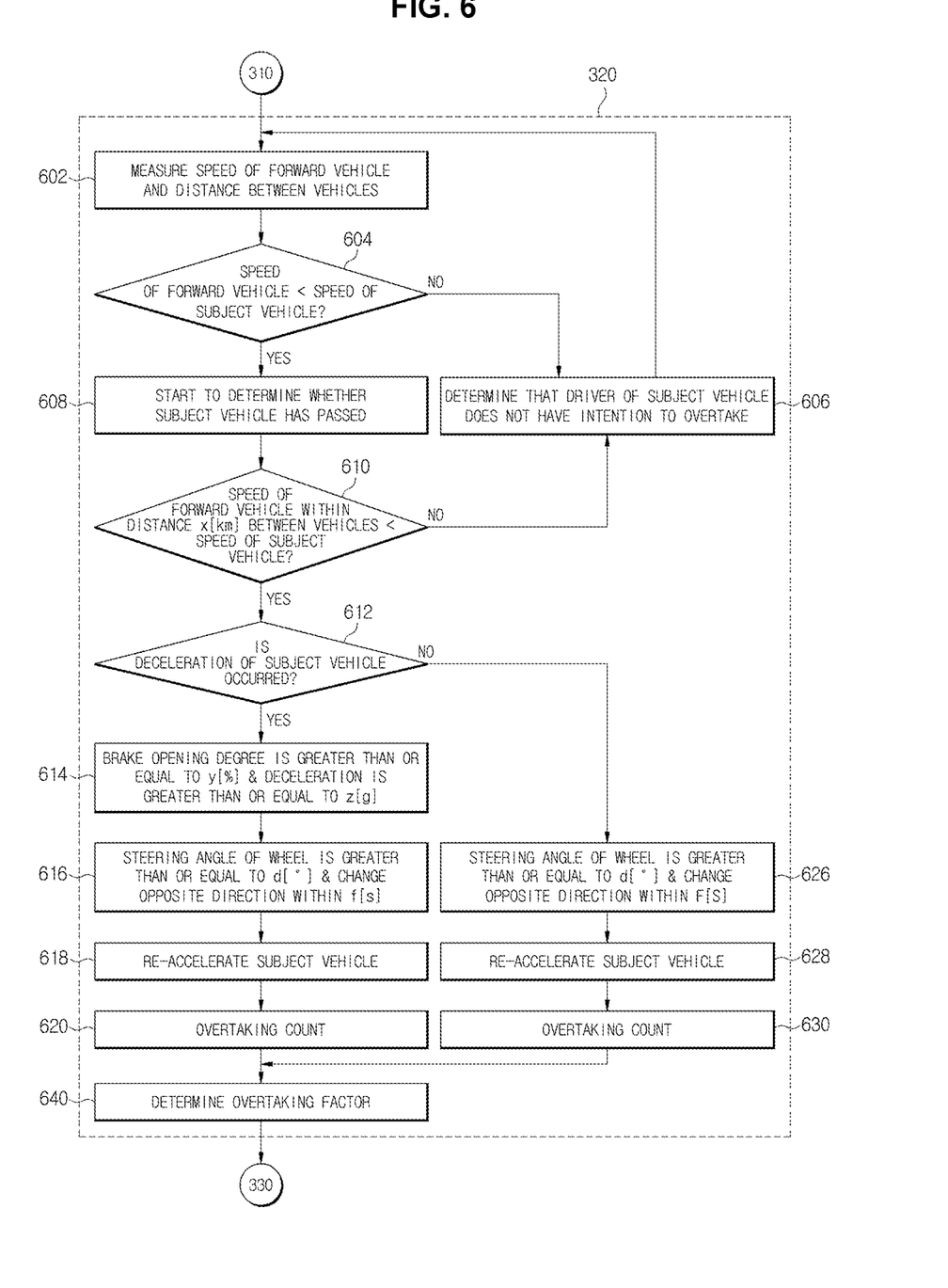
FIG. 6 is a view exemplarily illustrating a method of determining a vehicle overtaking factor according to various exemplary embodiments of the present invention.

FIG. 6 is a view exemplarily illustrating a method of determining a vehicle overtaking factor according to various exemplary embodiments of the present invention.

As illustrated in FIG. 6, to determine the overtaking factor, the integrated controller 102 first measures the speed of another vehicle in front and the distance between vehicles (602). The distance between vehicles may be a relative distance between the subject vehicle 100 and another vehicle in front.

The integrated controller 102 may compare the measured speed of the forward vehicle with the speed of the subject vehicle 100 being driven and identify whether the speed of the subject vehicle 100 is faster than the speed of the forward vehicle (604).

When the speed of the subject vehicle 100 is slower than or equal to the speed of the forward vehicle (NO in 604), the integrated controller 102 may determine that the driver of the subject vehicle 100 does not have intention to overtake (606) (after returning to operation 602). For the subject vehicle 100 to overtake the forward vehicle, the speed of the subject vehicle 100 may be faster than the speed of the forward vehicle.

Therefore, when the speed of the subject vehicle 100 is slower than or equal to the speed of the forward vehicle, it may be determined that the driver of the subject vehicle 100 has no intention to overtake the forward vehicle.

Conversely, when the speed of the subject vehicle 100 is faster than the speed of the forward vehicle (YES in 604), the integrated controller 102 may start to determine whether the subject vehicle 100 has passed (608). For the subject vehicle 100 to overtake the forward vehicle, the speed of the subject vehicle 100 may be faster than the speed of the forward vehicle. Therefore, when the speed of the subject vehicle 100 is faster than the speed of the forward vehicle, it may be determined that the driver of the subject vehicle 100 has intention to overtake the forward vehicle. However, even if the driver of the subject vehicle 100 has the intention to overtake, it is unclear whether it will actually lead to overtaking, so it is necessary to confirm whether or not the subject vehicle 100 actually passes through a series of processes as follows.

For example, the integrated controller 102 may determine whether the speed of the subject vehicle 100 is faster than the speed of the forward vehicle within a specific distance (e.g., x[km]) in which the distance between the subject vehicle 100 and the forward vehicle is preset (610). It may be said that the fact that the speed of the subject vehicle 100 is faster than the speed of the forward vehicle in a state where the distance between the subject vehicle 100 and the forward vehicle is sufficiently far is less related to the overtaking situation. However, when the distance between the subject vehicle 100 and the forward vehicle is close within a preset distance, if the speed of the subject vehicle 100 is faster than the speed of the forward vehicle, it may be determined that the possibility of the subject vehicle 100 overtaking the forward vehicle is relatively higher.

Subsequently, in a situation where the speed of the subject vehicle 100 is faster than the speed of the forward vehicle within the specific distance (e.g., x[km]) in which the distance between the subject vehicle 100 and the forward vehicle is preset (YES in 610), the integrated controller 102 may identify whether the deceleration of the subject vehicle 100 occurs (612). In the exemplary embodiment of the present invention, according to whether the subject vehicle 100 is decelerating, a case in which the overtaking possibility is relatively higher (614-620) and a case in which the overtaking possibility is relatively low (626-630) are classified, and a degree of increase of an overtaking count value is applied differently.

When the deceleration of the subject vehicle 100 occurs (YES in 612), the integrated controller 102 may increase the overtaking count value by 2 when the following event occurs in the subject vehicle 100.

614: When a brake opening amount is greater than or equal to a preset value (e.g., y[%]), and the deceleration of the subject vehicle 100 is greater than or equal to a preset value (e.g., z[g])

616: When a steering angle of a steering wheel of the subject vehicle 100 is greater than or equal to a preset angle (for example, d[°]), and then operated in an opposite direction of a previous steering direction within a preset time (for example, f[s])

618: When the subject vehicle 100 is re-accelerated after steering

The operations 614, 616, and 618 are maneuvers that occur with a very high probability when passing the forward vehicle. Therefore, when situations 614, 616, and 618 occur continuously, the integrated controller 102 may determine that the possibility that the subject vehicle 100 has overtaken the forward vehicle is very high, and increase the overtaking count value by 2 (620).

Conversely, when the deceleration of the subject vehicle 100 does not occur (NO in 612), the integrated controller 102 may increase the overtaking count value by 1 when the following event occurs in the subject vehicle 100.

626: When a steering angle of a steering wheel of the subject vehicle 100 is greater than or equal to a preset angle (for example, d[°]), and then operated in an opposite direction of a previous steering direction within a preset time (for example, f[s])

628: When the subject vehicle 100 is re-accelerated after steering

The operations 626 and 628 are maneuvers that occur with a very high probability when passing the forward vehicle. Therefore, when situations 626 and 618 occur continuously, the integrated controller 102 may determine that the possibility that the subject vehicle 100 has overtaken the forward vehicle is relatively high, and increase the overtaking count value by 1 (630).

Figure 7:
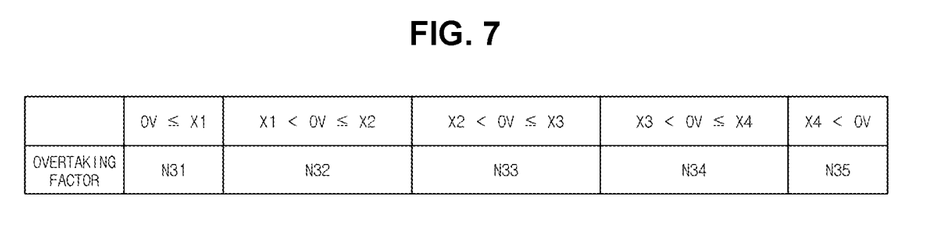
FIG. 7 is a view exemplarily illustrating a determination of a vehicle overtaking factor according to various exemplary embodiments of the present invention.

Subsequently, the integrated controller 102 may determine the overtaking factor by reflecting both the overtaking count value of the operations 614 to 620 and the overtaking count value of the operations 626 to 630 (640). FIG. 7 is a view exemplarily illustrating the determination of a vehicle overtaking factor according to the exemplary embodiment of the present invention. As illustrated in FIG. 7, the count value of the overtaking factor is classified into a plurality of sections, and different overtaking factor values are applied to each section.

Figure 8:
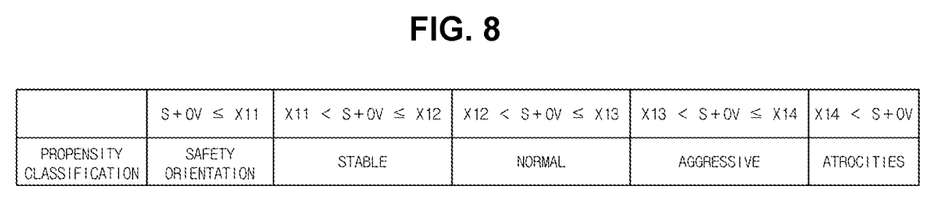
FIG. 8 is a view exemplarily illustrating a determination of a driving propensity index of a driver according to various exemplary embodiments of the present invention.

FIG. 8 is a view exemplarily illustrating a determination of a driving propensity index of a driver according to various exemplary embodiments of the present invention.

As illustrated in FIG. 8, when the speed factor is 'S' and the overtaking factor is 'OV', a sum of the speed factor 'S' and the overtaking factor 'OV' may be classified into the plurality of sections, and the driving propensity index of the driver may be assigned for each section. The integrated controller 102 may be classified 'safety orientation', 'stable', 'normal', 'aggressive', and 'atrocities' according to a size of 'S+OV', which is the sum of speed factor 'S' and overtaking factor 'OV'.

'Safety orientation' may be a propensity of drivers to drive with safety first in everything. 'Stable' may be a propensity to drive safely enough, although safety is not a top priority. 'Normal' does not prioritize safety, but may be a general propensity which is not violent. 'Aggressive' may be a propensity to drive somewhat roughly with sudden acceleration, sudden braking, and frequent lane changes. 'Atrocities' may be a propensity to drive very violently without considering safety at all. Among them, 'safety orientation', 'stable', and 'normal' may be classified as the driving propensity that prioritizes safety, and 'aggressive' and 'atrocities' may be classified as the driving propensity that does not prioritize safety.

Among them, the driving propensity of 'safety orientation', 'stable', and 'normal' is relatively stable driving propensity, so that the possibility of sudden braking is relatively low. However, since the driving propensity of 'aggressive' or 'atrocities' is rough and violent driving propensity, the possibility of sudden braking is very high. Therefore, in the vehicle 100 according to the exemplary embodiment of the present invention, the braking situation of the vehicle 100 may be predicted in advance by classifying the case where the driving propensity of the driver is 'atrocities' or 'aggressive', and by performing braking control and regenerative braking control corresponding to the predicted braking situation, the fuel economy of the vehicle 100 may be greatly improved. The prediction of the braking situation of the vehicle 100 will be described in detail with reference to FIG. 9 below.

Figure 9:
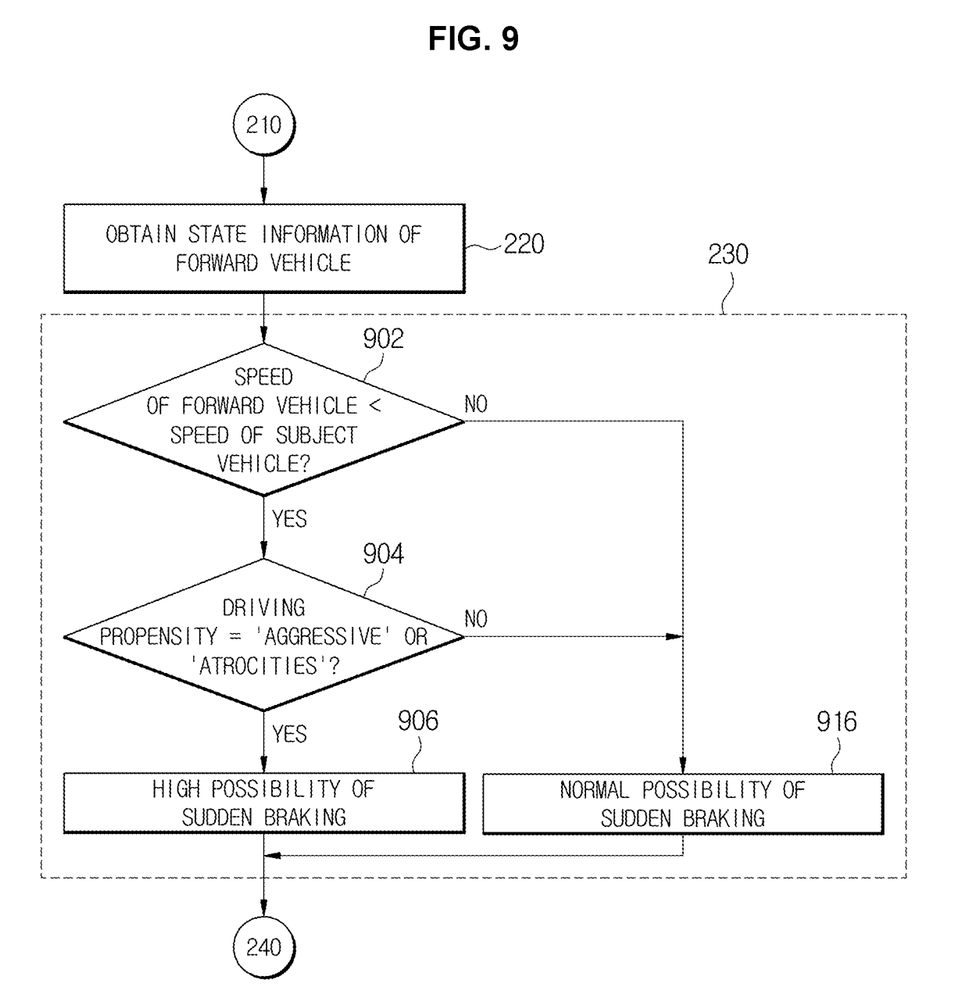
FIG. 9 is a view exemplarily illustrating prediction of a braking situation of a vehicle according to various exemplary embodiments of the present invention.

FIG. 9 is a view exemplarily illustrating prediction of a braking situation of a vehicle according to various exemplary embodiments of the present invention.

The braking situation prediction of FIG. 9 illustrates in more detail the operation of 'predicting the braking situation of the vehicle' illustrated in 230 of FIG. 2 described above.

As mentioned in the description of FIG. 2, the integrated controller 102 may obtain state information related to the forward vehicle before predicting the braking situation of the vehicle 100 (220). The state information related to the forward vehicle may include information related to the speed of the forward vehicle, the distance between vehicles, and the relative speed. The distance between vehicles may refer to the relative distance between the subject vehicle 100 and the forward vehicle. The relative speed may refer to the relative speed between the subject vehicle 100 and the forward vehicle.

In the state of obtaining the state information related to the forward vehicle, the integrated controller 102 first identifies whether the speed of the subject vehicle 100 is faster than the speed of the forward vehicle to predict the braking situation of the subject vehicle 100 (902).

When the speed of the subject vehicle 100 is faster than the speed of the forward vehicle (YES in 902), the integrated controller 102 may identify the result of determining the driving propensity of the driver (904).

When the speed of the subject vehicle 100 is faster than the speed of the forward vehicle (YES in 902) and the driving propensity of the driver is 'aggressive' or 'atrocities' (YES in 904), the integrated controller 102 may determine that the sudden braking situation may occur (906).

Conversely, when the speed of the subject vehicle 100 is not faster than the speed of the forward vehicle (NO in 902), or the driving propensity of the driver is 'safety orientation', 'stable', or 'normal' (NO in 904), the integrated controller 102 may determine that the possibility of the sudden braking situation occurring is normal (916).

Figure 10:
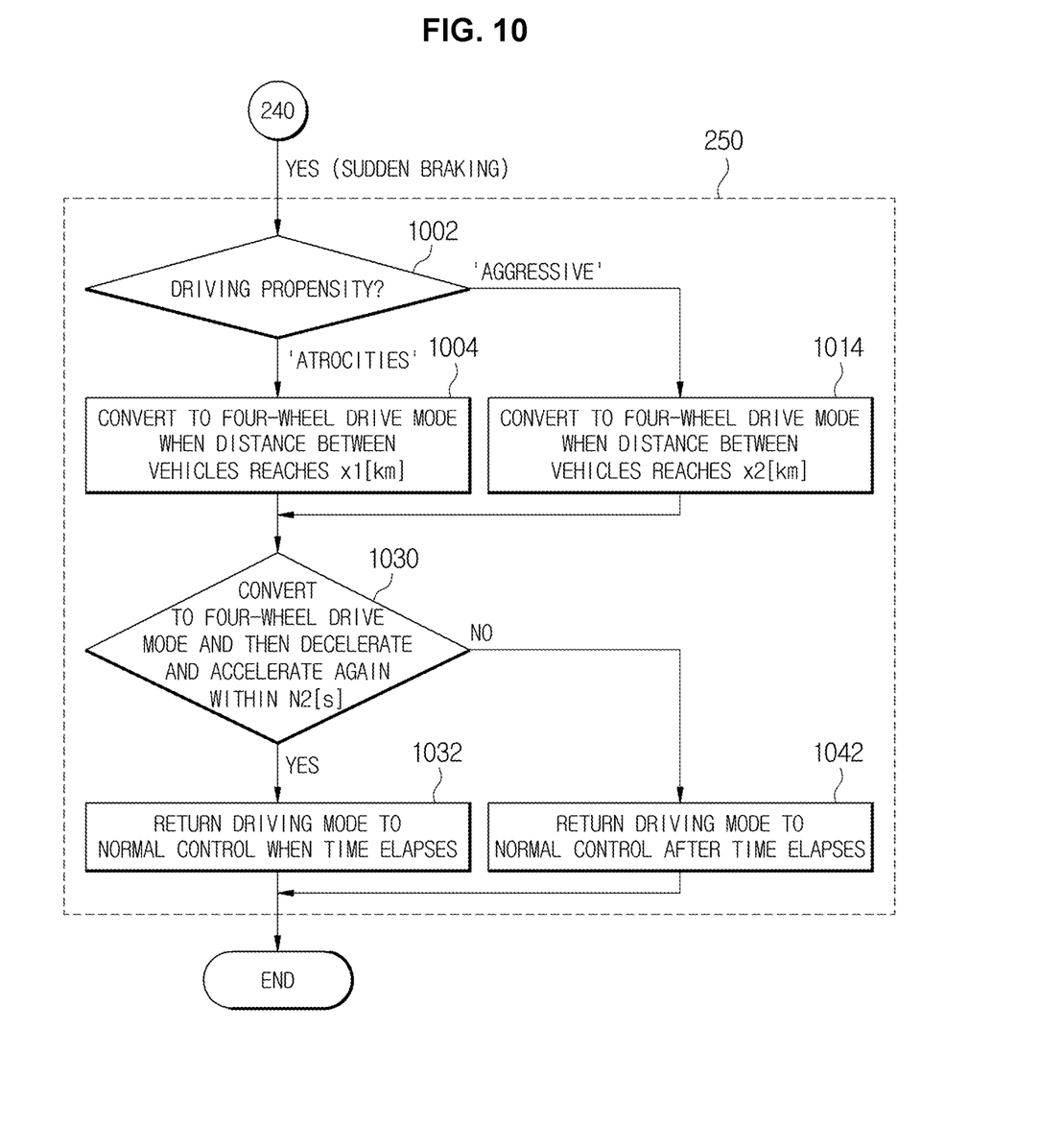
FIG. 10 is a view exemplarily illustrating front-wheel and rear-wheel brake distribution control when predicting sudden braking in a vehicle according to various exemplary embodiments of the present invention.

FIG. 10 is a view exemplarily illustrating front-wheel and rear-wheel brake distribution control when predicting sudden braking in a vehicle according to various exemplary embodiments of the present invention.

As illustrated in FIG. 10, when the sudden braking of the vehicle 100 is expected (YES in 240), the integrated controller 102 may classify the driving propensity of the driver into 'atrocities' and 'aggressive', and perform conversion to a four-wheel drive mode.

When the driver's driving propensity is 'atrocities' ('atrocities' in 1002), the integrated controller 102 may convert the subject vehicle 100 to the four-wheel drive mode when the distance between the subject vehicle 100 and the forward vehicle reaches a preset first inter-vehicle distance x1[km] (1004). At the instant time, the regenerative braking control of each of the front and rear wheels also follows the front/rear distribution ratio in the four-wheel drive mode.

When the driver's driving propensity is 'aggressive' ('aggressive' in 1002), the integrated controller 102 may convert the subject vehicle 100 to the four-wheel drive mode when the distance between the subject vehicle 100 and the forward vehicle reaches a preset second inter-vehicle distance x2[km] (1006). At the instant time, the regenerative braking control of each of the front and rear wheels also follows the front/rear distribution ratio in the four-wheel drive mode.

The preset first inter-vehicle distance x1[km] when the driving propensity is 'atrocities' is greater than the preset second inter-vehicle distance x2[km] when the driving propensity is 'aggressive' (x1>x2). Therefore, a timing of converting to four-wheel drive with the propensity to drive 'atrocities' precedes a time of converting to four-wheel drive with propensity to drive 'aggressive'. Since it may be determined that the higher the severity of the driving tendency is, the higher the probability of sudden braking, so it is desirable for drivers with 'atrocities' driving propensity to convert to the four-wheel drive mode earlier than drivers with 'aggressive' driving propensity to prepare for sudden braking in advance.

When the subject vehicle 100 converts to the four-wheel drive mode and then decelerates and accelerates again within a preset second time N2[s] (YES in 1030), the integrated controller 102 may return the driving mode from the four-wheel drive mode to a normal mode at the lapse of another preset first time N1[s] (1032). Here, the normal mode may be a control of a normal driving mode without considering the driving propensity of the driver.

Conversely, when the subject vehicle 100 does not decelerate and re-accelerate within a preset second time N2[s] after converting to the four-wheel drive mode (NO in 1030), the integrated controller 102 may return the driving mode from the four-wheel drive mode to a normal mode at the lapse of the preset second time N2[s]. Here, the normal mode may be the control of the normal driving mode without considering the driving propensity of the driver.

The second set time N2[s] may be a time required to determine that the driver is driving in the normal driving, that is, the 'safety orientation', the 'stable', and the 'normal' propensity without the sudden braking or the sudden acceleration. That is, when re-acceleration (i.e., overtaking) does not occur after deceleration (i.e., overtaking) until the second set time N2[s] elapses after the four-wheel drive conversion (NO in 1030), the integrated controller 102 may return the driving mode to the normal control when the second time N2[s] has elapsed (1042).

When re-acceleration (i.e., overtaking) occurs after deceleration before the second set time N2[s] elapses, the first set time N1[s] after overtaking may require an additional time to determine that the driving in the normal driving i.e., 'safety orientation', 'stable', and 'normal' propensities, and the additional time may be the first set time N1[s].

As described above, the vehicle 100 according to the exemplary embodiment of the present invention may include a four-wheel drive system including the main drive wheel and the auxiliary drive wheel. The vehicle 100 may be classified into a model provided with a disconnector for physically blocking power transmission to an auxiliary drive wheel and a model without the disconnector.

When the vehicle 100 according to the exemplary embodiment of the present invention is a vehicle provided with the disconnector, since a case where the braking in the four-wheel drive mode is required is determined in advance by the application of the present invention, and the mode is changed to the four-wheel drive mode before the braking is performed, problems which may occur due to vehicle turning and driving force transmission delay (delay due to a disconnector release process) may be prevented in advance. Furthermore, a loss of regenerative braking generated by hydraulically supplementing a certain amount of the total amount of braking required before power is transmitted to the auxiliary drive wheel during braking may be reduced, resulting in an increase in fuel economy.

When the vehicle 100 according to the exemplary embodiment of the present invention is a vehicle without the disconnector, torque distribution and brake distribution of the front and rear wheels may be performed through communication of control signals. In the instant case, due to the communication delay of the control signal, the certain amount of the required total amount of braking is supplemented with hydraulic pressure before torque distribution and braking distribution are performed. Accordingly, the loss of regenerative braking caused by hydraulic braking may be reduced through the present invention, obtaining an effect of increasing fuel efficiency.

According to the exemplary embodiments of the present invention, it is possible to predict the sudden braking and the overtaking of the subject vehicle based on the driving tendency of the driver of the subject vehicle and the state of another vehicle in the front of the vehicle, and improve the fuel economy of the vehicle by blocking or minimizing intervention of hydraulic braking by performing the four-wheel drive control and the regenerative braking control based on the predicted result.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a controller, and the controller may be configured by a plurality of controllers, or an integrated single controller.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling a vehicle, the method comprising:
   predicting, by a controller, a braking situation of the vehicle;
   performing, by the controller, brake distribution control of front and rear wheels of the vehicle in a response to a predicted sudden braking of the vehicle at a predetermined level; and
   performing, by the controller, independent braking control of the rear wheels of the vehicle in a response to a predicted general braking of the vehicle at a predetermined level.

2. The method according to claim 1, further including:
   determining, by the controller, a driving propensity of a driver of the vehicle;
   measuring, by the controller, a driving state of another vehicle driving in a front of the vehicle; and
   predicting, by the controller, the braking situation of the vehicle according to the driving propensity of the driver and the driving state of the another vehicle.

3. The method according to claim 2, wherein the determining of the driving propensity of the driver includes:
   determining a speed factor and an overtaking factor in a driving type of the driver; and
   determining a driving propensity index of the driver according to the speed factor and the overtaking factor.

4. The method according to claim 3, further including:
   determining, by the controller, a first speed factor according to occurrence of a case where a speed of the vehicle is faster than a prescribed speed of a road on which the vehicle is driven;
   determining, by the controller, a second speed factor according to a frequency of occurrence of a case where the speed of the vehicle is faster than a speed of the another vehicle located in the front of the vehicle; and
   determining, by the controller, a sum of the first speed factor and the second speed factor as the speed factor.

5. The method according to claim 3, further including:
   determining, by the controller, the overtaking factor according to an overtaking maneuver of the vehicle when a speed of the vehicle is faster than a speed of the another vehicle located in the front of the vehicle.

6. The method according to claim 2, wherein the driving state of the another vehicle includes a speed of the another vehicle, a relative speed of the another vehicle with respect to the vehicle, and a distance between the vehicle and the another vehicle.

7. The method according to claim 2, wherein the driving propensity of the driver includes a first driving propensity in which safety of driving is prioritized and a second driving propensity in which the safety of the driving is not prioritized, depending on a degree of the driver's consideration for safe driving.

8. The method according to claim 7, wherein the predicting of the braking situation of the vehicle includes:
   expecting that sudden braking of the vehicle occurs in a response to the vehicle's speed being faster than a speed of the another vehicle in the front of the vehicle, and in a response to the driving propensity being the second driving propensity in which the safety of the driving is not prioritized.

9. The method according to claim 8, further including:
upon determining that the sudden braking of the vehicle is expected, converting the vehicle to a four-wheel drive mode in a response to a distance between the vehicle and the another vehicle reaching a preset distance between the vehicle and the another vehicle; and
releasing the four-wheel drive mode in a response to a lapse of a preset time after converting to the four-wheel drive mode.

10. A vehicle including:
a four-wheel drive system; and
a controller connected to the four-wheel drive system and configured to
predict a braking situation of the vehicle,
perform brake distribution control of front and rear wheels of the vehicle in a response to a predicted sudden braking of the vehicle at a predetermined level, and
perform independent braking control of the rear wheels of the vehicle in a response to a predicted general braking of the vehicle at a predetermined level.

11. The vehicle according to claim 10, wherein the controller is configured to:
determine a driving propensity of a driver of the vehicle;
measure a driving state of another vehicle driving in a front of the vehicle; and
predict the braking situation of the vehicle based on the driving propensity of the driver and the driving state of the another vehicle.

12. The vehicle according to claim 11, wherein the determining of the driving propensity of the driver includes:
determining a speed factor and an overtaking factor in a driving type of the driver; and
determining a driving propensity index of the driver according to the speed factor and the overtaking factor.

13. The vehicle according to claim 12, wherein the controller is configured to:
determine a first speed factor according to occurrence of a case where a speed of the vehicle is faster than a prescribed speed of a road on which the vehicle is driven;
determine a second speed factor according to a frequency of occurrence of a case where the speed of the vehicle is faster than a speed of the another vehicle located in the front of the vehicle; and
determine a sum of the first speed factor and the second speed factor as the speed factor.

14. The vehicle according to claim 12, wherein the controller is configured to determine the overtaking factor according to an overtaking maneuver of the vehicle when a speed of the vehicle is faster than a speed of the another vehicle located in the front of the vehicle.

15. The vehicle according to claim 11, wherein the driving state of the another vehicle includes a speed of the another vehicle, a relative speed of the another vehicle with respect to the vehicle, and a distance between the vehicle and the another vehicle.

16. The vehicle according to claim 11, wherein the driving propensity of the driver includes a first driving propensity in which safety of driving is prioritized and a second driving propensity in which the safety of the driving is not prioritized, depending on a degree of the driver's consideration for safe driving.

17. The method according to claim 16, wherein the predicting of the braking situation of the vehicle includes:
expecting that sudden braking of the vehicle occurs in a response to the vehicle's speed being faster than a speed of the another vehicle in the front of the vehicle, and in a response to the driving propensity being the second driving propensity in which the safety of the driving is not prioritized.

18. The method according to claim 17, wherein the controller is configured to:
upon determining that the sudden braking of the vehicle is expected, convert the vehicle to a four-wheel drive mode in a response to a distance between the vehicle and the another vehicle reaching a preset distance between the vehicle and the another vehicle; and
release the four-wheel drive mode in a response to a lapse of a preset time after converting to the four-wheel drive mode.

19. A method of controlling a vehicle, the method including:
determining, by a controller, a driving propensity of a driver of the vehicle;
measuring, by the controller, a driving state of another vehicle driving in front of the vehicle;
predicting, by the controller, a braking situation of the vehicle according to the driving propensity of the driver and the driving state of the another vehicle;
performing, by the controller, brake distribution control of front and rear wheels of the vehicle in a response to a predicted sudden braking of the vehicle at a predetermined level; and
performing, by the controller, independent braking control of the rear wheels of the vehicle in a response to a predicted general braking of the vehicle at a predetermined level.

20. The method according to claim 19,
wherein the driving propensity of the driver includes a first driving propensity in which safety of driving is prioritized and a second driving propensity in which the safety of the driving is not prioritized, depending on a degree of the driver's consideration for safe driving; and
wherein the predicting of the braking situation of the vehicle includes expecting that sudden braking of the vehicle occurs in a response to the vehicle's speed being faster than a speed of the another vehicle in the front of the vehicle, and the driving propensity being the second driving propensity in which the safety of the driving is not prioritized.

\* \* \* \* \*